July 9, 1929.  H. MILLER  1,720,185
LIQUID CLARIFYING APPARATUS
Filed April 25, 1927
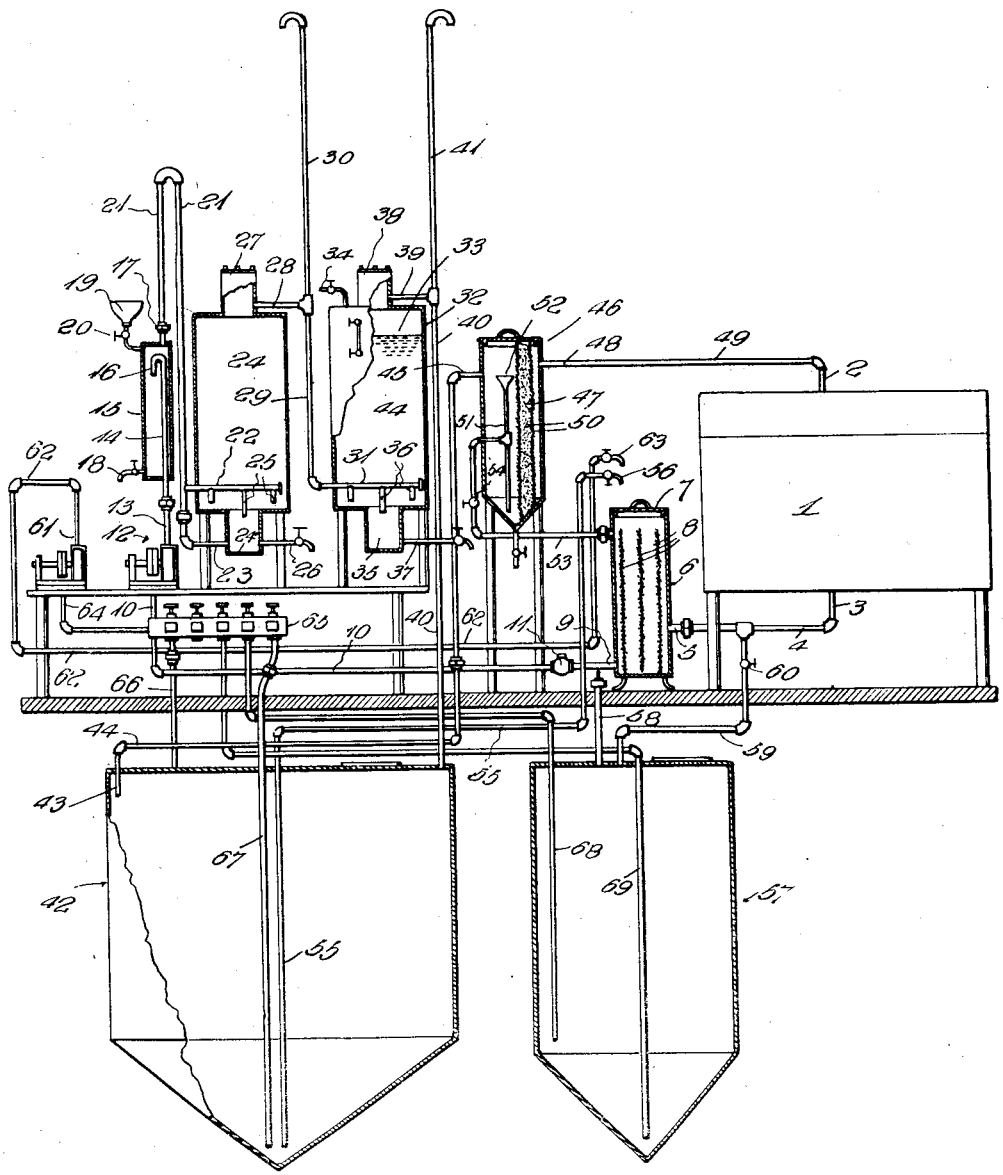
Witness
Inventor
Harry Miller,
By H. B. Willson & Co.
Attorneys Patented July 9, 1929.

1,720,185

UNITED STATES PATENT OFFICE.

HARRY MILLER, OF OKMULGEE, OKLAHOMA.

LIQUID-CLARIFYING APPARATUS.

Application filed April 25, 1927. Serial No. 186,438.

The invention is a new and improved apparatus designed primarily for clarifying such liquids as gasoline, naphtha and kerosene, which have been used in a dry cleaning washer, it being customary to charge the liquid with one or more chemicals to cause more effective garment cleaning.

It is the object of the invention to provide an apparatus of the character set forth, which will be unusually efficient and advantageous, for the purpose of clarifying the liquid, bleaching it, and removing all impurities and undesirable odors.

With the foregoing in view, the invention resides in the novel subject matter hereinafter described and claimed, the description being supplemented by the accompanying drawing, in which a sectional view partly in elevation, is shown, disclosing the apparatus.

The numeral 1 on the drawings denotes a dry cleaning washer having a liquid inlet 2 and a liquid outlet 3. Piping 4 leads from the outlet 3 to the inlet 5 of a liquid trap 6, which trap preferably consists of a vertically elongated tank having a removable top 7 and provided with a plurality of spaced vertical screens or strainers 8, said screens or strainers being disposed between the inlet 5 and the outlet 9 of the trap. Piping 10 having a check valve 11, leads from the outlet 9 to a suitable pump 12, and this pump is provided with a discharge pipe 13 connected with the liquid inlet pipe 14 of a charging tank 15, said pipe 14 having a downturned upper end 16 disposed within the upper portion of this tank. The liquid outlet of the charging tank, is shown at 17, and 18 denotes a valved drain for said tank. At 19, I have shown a charging hopper provided with a valve 20, said hopper being used for injecting chlorinated lime or other desired chemical into the tank. Suitable piping 21, leads from the liquid outlet 17, to upper and lower liquid inlet pipes 22—23, of an agitating tank 24. The lower end of this tank is provided with a well 24' into which the pipe 23 discharges. The pipe 22 however, is above this well and is provided with a plurality of downwardly directed discharge nozzles 25, at least one of which is positioned to discharge liquid into the well 24'. From this well, I provide a valved drain 26.

The upper end of the agitating tank 24 is preferably provided with a dome 27 from which the liquid outlet 28 extends. This outlet communicates with piping 29 having a vent portion 30 at its upper end, while the lower end of said pipe 29 discharges into the liquid inlet pipe 31 of a washing tank 32, which tank contains water to substantially the level 33. To supply this water to the tank 32, a valved water inlet 34 may be employed, for connection to a city water system or other source.

The lower end of the tank 32 is provided with a well 35, and the pipe 31 is equipped with downwardly projecting discharge nozzles 36, at least one of which is positioned to discharge into said well. From this well, a valved drain 37 may be provided.

The upper end of the washing tank 32 is preferably provided with a dome 38 from which a liquid outlet pipe 39 extends. This pipe discharges into a vertical pipe 40 having an upper, vent portion 41. The lower end of this pipe discharges into a precipitating tank 42 which is preferably located below ground. A liquid outlet 43 is provided having its inlet end spaced downwardly to a suitable extent from the top of the tank 42, and said outlet 43 communicates with a pipe 44 which is connected with the liquid inlet 45 of a filter 46. The comparatively clean liquid from the precipitating tank 42, discharges through the pipe 44, while the relatively heavy liquids settle to the bottom of said tank and the lighter and soapy substances, rise to the top portion of said tank, above the inlet end of the outlet 43. The comparatively clean liquid enters the filter 46 and must pass through a filtering medium 47, such as cotton waste, before it can reach the outlet 48 of said filter. From this outlet, the finally purified liquid passes through a pipe 49 to the inlet 2 of the washer 1, for further use. Preferably, the filtering medium 47 is held between spaced, vertically disposed screens 50, in the filter 46. Between this filtering means and the side of the filtering tank provided with the inlet 45, I provide vertical piping 51 open at both its upper and lower ends, and preferably flared at its upper end as denoted at 52. From this pipe 51, piping 53, having a control valve 54 leads to the trap 6. Any relatively heavy liquid reaching the filter 46, descends below the outlet 48 and by means of the piping 51—53 may be returned to the trap 6, for repassage through the apparatus.

55 denotes a pipe line leading from the lower end of the precipitating tank 42, to a spigot or the like 56 which is so positioned that said pipe line and spigot may be used the conducting relatively heavy liquid from the lower portion of the tank 42, into the trap 6, upon removal of its cover 7. Spigot 56 is below the highest liquid-containing portion of the apparatus and hence upon opening of said spigot, discharge of liquid will take place.

57 denotes a liquid supply tank preferably located below the surface of the ground, said tank being provided with a suitable inlet pipe 58 by means of which it may be filled. A pipe 59, having a valve 60 leads from the pipe 4 into the tank 57 and may be used, when the apparatus is not in operation, for returning liquid from the cleaner 1 into said tank 57.

61 denotes a second pump having a discharge line 62 terminating in a spigot or the like 63, positioned to discharge into the trap 6, upon removal of its cover 7. The inlet 64 of pump 61, may by proper manipulation of a group of valves 65, be placed in communication with either of the pipes 66—67 of the precipitating tank 42, or with either of the pipes 68—69, of the supply tank 57. Pipe 66 is for the purpose of carrying off the light soapy liquid from the upper portion of the precipitating tank 42 when desired. Pipe 67 may be employed for drawing off the comparatively heavy liquid which settles to the bottom of the aforesaid precipitating tank 42. Pipe 68 is employed when initially filling the apparatus from the supply tank 57, and pipe 69 may be used as a clean-out for said supply tank. The discharge line 62 of the pump 61 may deliver into the trap 6 or outside of said trap, according to requirements and the character of fluid being discharged.

When preparing initially to operate the apparatus, the supply tank 57 is filled with the desired liquid, through the inlet 58, approximately three pounds of chlorinated lime are dissolved in a small amount of hot water and poured into the charge tank 15, through the funnel 19 and the open valve 20, after which the valve is closed, and the valve 34 is opened to fill the washing tank 32, to the desired level. Now, both the pumps 12 and 61 are started to fill the apparatus until the dry cleaning washer 1 is about half full of liquid and the remainder of the apparatus is completely filled. Then, the pump 61 is shut off, said pump having been used to draw liquid from the supply tank 57 and discharge it through the spigot or the like 63, into the trap 6, incident to filling of the apparatus. The pump 12 now continues to operate and consequently it effects circulation of the liquid. This liquid is pulled through the pipe 10 and forced first into the charge tank 15, where it picks up and mixes with the chlorinated lime solution. Then, the liquid passes on through the piping 21 into the agitating tank 24, in which a whirling of the liquid takes place and the lime destroys the oils and fats, and the chlorine gas exerts a bleaching action upon the liquid. This liquid leaves the agitating tank 24 through the pipe 29 and enters the water wash tank 32, in which whirling of the liquid occurs so that all soluble matter in the liquid is dissolved and moreover such liquid is deodorized. A small amount of chlorine gas follows the liquid into the washing tank 32 and causes further bleaching thereof. All fumes and gases escape through the vents 30—41, and the liquid from the washing tank 32 discharges through the pipe 40 into the precipitating tank 42. In this tank, the cleaning liquid precipitates and all relatively heavy liquids and impurities drop to the bottom, whereas chemicals and soapy substances, being relatively light rise to the top of the tank. The clean liquid discharges through the outlet 43 and the pipe 44 to the filter 46, and the relatively heavy liquid and impurities are passed back to the trap 6 through piping 51—53, when desired, for retreatment. The cleaner liquid entering the filter 46, passes through the screens 50 and the filtering medium 47 and the latter holds back any water and chemicals still existing in the liuqid. The water settles to the bottom and the light chemicals rise to the top, so that these may be discharged through the piping 51—53, to the trap 6, for further treatment. The clean liquid passes on through the pipe 49 into the dry cleaner 1, for further use.

Excellent results have been obtained from the construction and relation of parts herein shown, for which reason, the present disclosure is preferably followed. However, within the scope of the invention as claimed, variations may be made.

I claim:—

1. A liquid clarifying apparatus comprising a trap having a liquid inlet and a liquid outlet, a charge tank having a liquid inlet and a liquid outlet, means placing the liquid outlet of said trap in communication with the liquid inlet of said charge tank, an agitating tank having a liquid inlet and a liquid outlet, means placing the liquid outlet of said charge tank in communication with the liquid inlet of said agitating tank, a washing tank having a liquid inlet and a liquid outlet, means placing the liquid outlet of said agitating tank in communication with the liquid inlet of said washing tank, a precipitating tank having a liquid inlet and a liquid outlet, the latter being between the liquid level and the tank bottom, means placing the liquid outlet of said washing tank in communication with the liquid inlet of said precipitating tank, a filter having a liquid inlet and an outlet, and means placing the liquid outlet of said precipitating tank in communication with the liquid inlet of said filter.

2. A liquid clarifying apparatus comprising a trap having a liquid inlet and a liquid outlet, a charge tank having a liquid inlet and a liquid outlet, means placing the liquid outlet of said trap in communication with the liquid inlet of said charge tank, an agitating tank having a liquid inlet and a liquid outlet, means placing the liquid outlet of said charge tank in communication with the liquid inlet of said agitating tank, a washing tank having a liquid inlet and a liquid outlet, means placing the liquid outlet of said agitating tank in communication with the liquid inlet of said washing tank, a precipitating tank having a liquid inlet and a liquid outlet, the latter being between the liquid level and the tank bottom, means placing the liquid outlet of said washing tank in communication with the liquid inlet of said precipitating tank, a filter having a liquid inlet and an outlet, means placing the liquid outlet of said precipitating tank in communication with the liquid inlet of said filter, and valved, heavy liquid return means from the filter to the aforesaid trap.

3. A liquid clarifying apparatus comprising a trap having a liquid inlet and a liquid outlet, a charge tank having a liquid inlet and a liquid outlet, means placing the liquid outlet of said trap in communication with the liquid inlet of said charge tank, an agitating tank having a liquid inlet and a liquid outlet, means placing the liquid outlet of said charge tank in communication with the liquid inlet of said agitating tank, a washing tank having a liquid inlet and a liquid outlet, means placing the liquid outlet of said agitating tank in communication with the liquid inlet of said washing tank, a precipitating tank having a liquid inlet and a liquid outlet, the latter being between the liquid level and the tank bottom, means placing the liquid outlet of said washing tank in communication with the liquid inlet of said precipitating tank, a filter having a liquid inlet and an outlet, means placing said liquid outlet of said precipitating tank in communication with said liquid inlet of said filter, and a valved heavy liquid return line from the lower end of said precipitating tank to said trap.

4. A liquid clarifying apparatus comprising a trap having a liquid inlet and a liquid outlet, a charge tank having a liquid inlet and a liquid outlet, means placing the liquid outlet of said trap in communication with the liquid inlet of said charge tank, an agitating tank having a liquid inlet and a liquid outlet, means placing the liquid outlet of said charge tank in communication with the liquid inlet of said agitating tank, a washing tank having a liquid inlet and a liquid outlet, means placing the liquid outlet of said agitating tank in communication with the liquid inlet of said washing tank, a precipitating tank having a liquid inlet and a liquid outlet, the latter being between the liquid level and the tank bottom, means placing the liquid outlet of said washing tank in communication with the liquid inlet of said precipitating tank, a filter having a liquid inlet and an outlet, means placing said liquid outlet of said precipitating tank in communication with said liquid inlet of said filter, and valved heavy liquid return lines from said precipitating tank and said filter to said trap.

5. A liquid clarifying apparatus comprising a trap having a liquid inlet and a liquid outlet, a charge tank having a liquid inlet and a liquid outlet, means placing the liquid outlet of said trap in communication with the liquid inlet of said charge tank, an agitating tank having a liquid inlet and a liquid outlet, means placing the liquid outlet of said charge tank in communication with the liquid inlet of said agitating tank, a washing tank having a liquid inlet and a liquid outlet, means placing the liquid outlet of said agitating tank in communication with the liquid inlet of said washing tank, a precipitating tank having a liquid inlet and a liquid outlet, the latter being between the liquid level and the tank bottom, means placing the liquid outlet of said washing tank in communication with the liquid inlet of said precipitating tank, a filter having a liquid inlet and an outlet, means placing the liquid outlet of said precipitating tank in communication with the liquid inlet of said filter, a liquid supply tank, a pump having a liquid outlet line which may discharge into said trap, inlet lines for the pump leading from the lower portions of the precipitating tank and the supply tank and from the upper portion of said precipitating tank, and valves for placing any of said inlet lines in communication with the pump.

6. In a liquid clarifying apparatus embodying a trap and a precipitating tank which receive the liquid in the order stated, a supply tank, a pump having an outlet line which may discharge into said trap, inlet lines for said pump leading from the lower portions of said precipitating tank and said supply tank and from the upper portion of said precipitating tank, and valves for placing any of said inlet lines in communication with the pump.

In testimony whereof I have hereunto affixed my signature.

HARRY MILLER.